March 8, 1955     J. T. MONTGOMERY     2,703,721
SADDLE TYPE SERVICE CLAMP PIPE COUPLING
Filed March 25, 1950
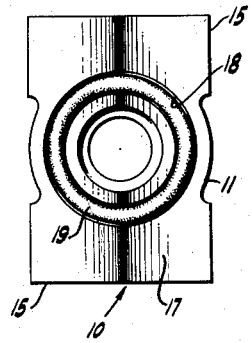
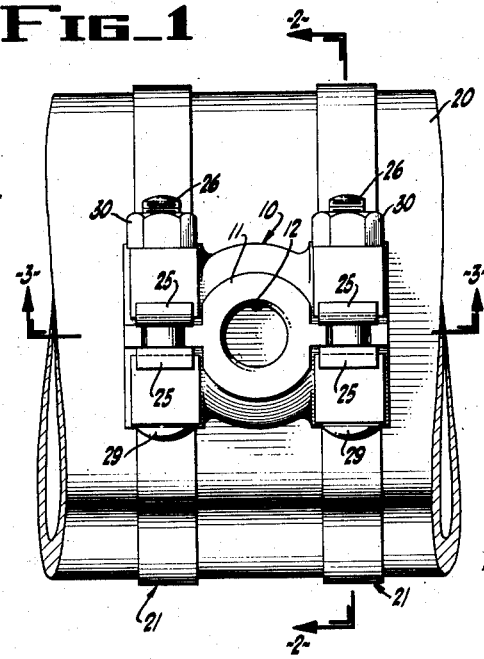
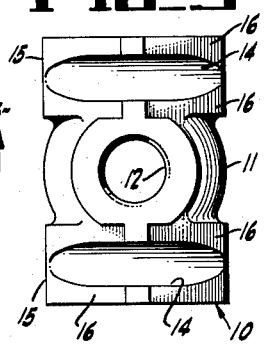
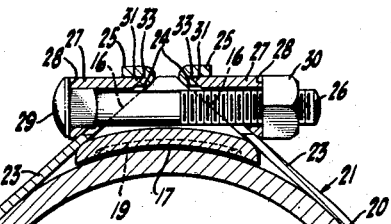
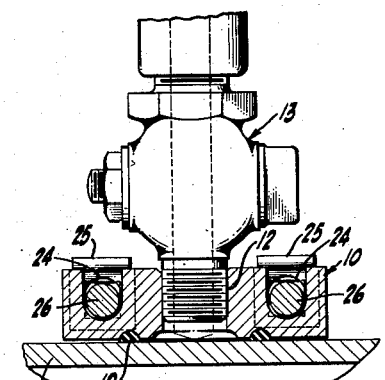
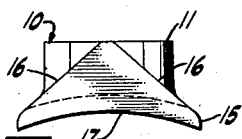
INVENTOR.
JOHN T. MONTGOMERY
BY
*Mellin and Hanson*
ATTORNEYS

United States Patent Office 2,703,721
Patented Mar. 8, 1955

2,703,721

SADDLE TYPE SERVICE CLAMP PIPE COUPLING

John T. Montgomery, San Francisco, Calif.

Application March 25, 1950, Serial No. 151,897

3 Claims. (Cl. 285—108)

This invention relates to service clamps and is particularly concerned with clamps adapted to be engaged about a fluid main and to be secured thereto to permit drilling of the main and the attachment thereto of a service pipe.

While service clamps have long been used in the manner of and for the purpose of the present invention considerable difficulty has frequently been encountered in providing a permanent, effective and efficient seal of the clamp with the main. Difficulty has also been encountered in providing an adequate securing means for the clamp by which it may conform to variations in the external configuration of the main to which it is applied. Furthermore, many of the service clamps heretofore used have been cumbersome and of such multiplicity of parts as to render them difficult to apply and adjust and expensive in manufacture. The present invention seeks to overcome such difficulties.

It is therefore among the general objects of the invention to provide a novel and improved service clamp for application to a main by which the main may be drilled and connection made for the distribution of fluid therefrom to a service pipe.

Another important object of the present invention is to provide a novel and improved sealing means for a service clamp such that a permanent effective and efficient seal between the clamp and the main may be established and maintained over a long period of time.

A further object of the present invention is to provide a novel and improved securing means for a service clamp whereby the clamp may be securely retained on the service main and whereby the clamping means may adjust itself to variations in the external contour of the main to which it is applied.

Another object of the present invention is to provide a simple and improved service clamp having a minimum number of parts and one which may be simply and easily applied without requiring the use of special tools or fixtures and which is of rugged construction and readily suited to the demands of economic manufacture.

Numerous other objects and features of the present invention will be apparent from the consideration of the following specification when taken in conjunction with the accompanying drawings, in which Figure 1 is a top plan view of the service clamp of the present invention as applied to a fluid main, Figure 2 is a transverse section through the main and the clamp taken on the line 2—2 of Figure 1, Figure 3 is a vertical fragmentary longitudinal section taken on the line 3—3 of Figure 1, Figure 4 is a bottom plan view of the saddle plate of the present clamp structure, Figure 5 is a top plan view of the saddle plate shown in Figure 4, and Figure 6 is an end elevation of the saddle plate.

In general terms the present invention may be defined as including a saddle plate having a central boss in which is located a tapped aperture, the under face of the plate having an annular recess closely adjacent the aperture within which is mounted an O ring gasket which is adapted to engage the outer surface of the main and seal the aperture thereto so as to preclude the escape of fluid between the main and the saddle plate. On either side of the boss the plate is provided with upwardly extending converging faces each of which has a transversely extending bolt receiving groove. The clamp is also characterized by the provision of a pair of main encircling bands, the free ends of which are flat and are pierced to receive securing bolts and beyond such piercing the bands are turned back upon themselves to provide lug stop surfaces. Seated upon the external surface of each end of each band there is a triangular lug which receives therethrough a securing bolt. The face of the lug lying against the band is disposed at an equal angle to the inclined surrface of the saddle against which the end of the band lies so that as the bolt is turned to draw the lugs together they will move up the inclination pushing against the return bent ends of the bands to tighten the bands around the main and urge the saddle downwardly against the main.

Referring more particularly to the drawings, the numeral 10 is used to designate the saddle plate generally. As indicated, the saddle plate is provided with a central boss 11 which is apertured as at 12. The aperture is tapped in order to receive a corporation valve as indicated by the numeral 13 in Figure 3. The upper surface of the saddle plate 10 is provided with a pair of transversely extending bolt grooves 14 formed to extend across triangular wings 15 of the plate formed on either side of the boss and providing inclined surfaces 16.

As more clearly indicated in Figure 6 the lower face of the saddle plate 10 is formed of convex configuration, as indicated at 17, and as more clearly shown in Figure 4 the lower surface is provided with an annular semi-circular groove 18 closely adjacent the opening of the lower end of the aperture 12. As noted in Figure 3 an O ring gasket 19 is placed within the groove 18 and engages the outer surface of the main 20 so as to form a seal. As indicated, when pressure is applied on the saddle plate by the securing means, the outer surface of the O ring is flattened against the surface of the main 20 in such manner as to provide an extended flat gasket seal between the saddle and the O ring.

For securing the saddle plate to the main 20 there is provided a pair of securing bands 21 which are preferably of substantially flat steel having sufficient elasticity to permit bending and expansion thereof to permit their passage around the main and to permit drawing of the ends of the bands together to firmly secure the same to the main.

As more clearly indicated in Figure 2 of the drawing, the intermediate body portion 22 of the bands 21 is formed to be normally circular so as to conform in general to the external conformation of the main 20. Each end of the bands, however, is provided with a flat terminal portion 23 which is pierced at 24 with an elongated or oval-shaped aperture and beyond such aperture each band is reversely bent to form a stop 25.

Extending through each pair of terminal ends of each band there is provided a securing bolt 26, the intermediate portion of which is adapted to rest within the grooves 14 of the saddle plate. Mounted on the erternal extremities of the bolts 26 and lying upon the flat portions 23 of the bands and engaging the stops 25 there is provided a pair of lugs 27, each of which are of triangular section in the vertical plane as shown in Figure 2 and each of which are centrally pierced to receive the bolt therethrough. The outer transverse surfaces 28 of each lug 27 is flat and adapted to receive either the head 29 or the nut 30 of the bolt in such manner that as the nut is tightened upon the bolt the head and nut force the lugs together and their angular inner surfaces bear against the outer flat surfaces 23 of the terminal portions of the band while the upper apex 31 of each of the lugs engages the juncture of the portion 33 of the band with the returned bent stop 25 thereof.

It will of course be obvious that as the nut is tightened upon the bolt the bands are drawn together as the lugs tend to creep up the inclined surfaces 16 of the saddle whereby the saddle is firmly seated and secured against the outer surface of the main.

As mentioned above, it will be noted that as the saddle is urged tightly against the surface of the main with its convex under surface conforming with the outer circular surface of the main the O ring will be urged tightly against the outer surface and since the seat within the saddle for the O ring is only semi-circular while the O ring is a full circle it will provide for a flattening of the O ring against the surface of the main whereby a uniform and extended broad seal is provided between the saddle and the main.

As indicated in Figure 3, in use of the present invention the saddle is secured to the main by means of the clamping bands, as indicated, and a so-called "corporation valve" is applied as indicated and with the valve in open position a drill is inserted through the valve and the main is tapped whereupon the drill is removed and the valve closed so as to permit connection of the service pipes as desired to the "corporation valve" which is subsequently opened to permit the flow of fluid from the main to the service pipes.

From the foregoing it will be seen that the present invention provides a novel, improved, simple, rugged and efficient service clamp by use of which there is insured a permanent tight engagement of its saddle against the service main; sealing means being provided by which such engagement assures a leak-proof connection with the service main at all times. It will be noted that as the clamp is tightened by means of the bolt the lugs thereof are permitted a sliding movement on the flat inclined surfaces of the wings so that the securing bands may conform with slight variations in the surface characteristics of the main.

While one preferred structural embodiment of the invention is here presented it will be understood that numerous changes, modifications and the full use of equivalents may be restored to in the practice of the invention without departure from the spirit or scope of the invention as outlined in the appended claims.

Having thus described my invention, what I claim and desire to secure by Letters Patent is:

1. In a service clamp, a saddle, having an apertured and threaded boss adapted to receive a corporation valve and a concave under surface adapted to fit the exterior of a main to be tapped, an annular semicircular groove in said under surface adjacent the aperture, an O ring seated within said groove adapted to seal the aperture to the main, a pair of wings extending outwardly from the saddle on either side of the boss having outwardly converging inclined surfaces, bolt receiving grooves in said wings, a pair of bands adapted to encircle a main each band having flat end portions adapted to lie upon said inclined surfaces and having return bent stop extremities, bolts in said grooves and extending through the flat portions of said bands and triangular lugs mounted on said bolts and engaging the converging inclined surfaces and the stop extremities of the bands operable upon tightening of the bolts to tension the bands around a main and force the saddle tightly into sealing engagement with a main.

2. In a service clamp, a saddle having a threaded opening therethrough adapted to receive a corporation valve, a pair of bands having flat ends for securing the saddle to a main, converging outwardly inclined surfaces on the saddle to receive the ends of the bands in sliding relation therewith, said saddle having grooves opening through the inclined surfaces, a single bolt disposed in each of the grooves and receivable through the ends of each of the bands, and nuts on the bolts threadable therealong for causing the ends of the bands to move together and thereby up the inclined surfaces and react thereagainst to draw the saddle down into sealing engagement with a main encircled by said bands.

3. In a service clamp, a saddle having a threaded opening therethrough adapted to receive a corporation valve, a pair of bands having flat ends for securing the saddle to a main, outwardly converging inclined surfaces on the saddle to receive the ends of the bands, said saddle having grooves opening through the inclined surfaces, a single bolt disposed in each of the grooves and receivable through the ends of each of the bands, nuts on the bolts threadable therealong for causing the ends of the bands to move together and thereby up the inclined surfaces and react thereagainst to draw the saddle down into sealing engagement with a main encircled by said bands, and lugs receivable on the bolts and having inclined inner surfaces engaging the ends of the bands which are in sliding contact with said inclined surfaces and having transverse outer faces engaging the heads of the bolts and the nuts respectively, the ends of the bands being bent to provide stops engaging said lugs.

References Cited in the file of this patent

UNITED STATES PATENTS

| | | |
|---|---|---|
| 477,173 | Ford et al. | June 14, 1892 |
| 591,796 | De Wolf | Oct. 12, 1897 |
| 785,350 | Custer | Mar. 21, 1905 |
| 1,185,927 | O'Brien | June 6, 1916 |
| 1,361,956 | Bartholomew | Dec. 14, 1920 |
| 1,459,030 | Mueller | June 19, 1923 |
| 2,488,064 | Mueller | Nov. 15, 1949 |

FOREIGN PATENTS

| | | |
|---|---|---|
| 271,279 | Great Britain | May 26, 1927 |